ature-weight, showing the weight raised and

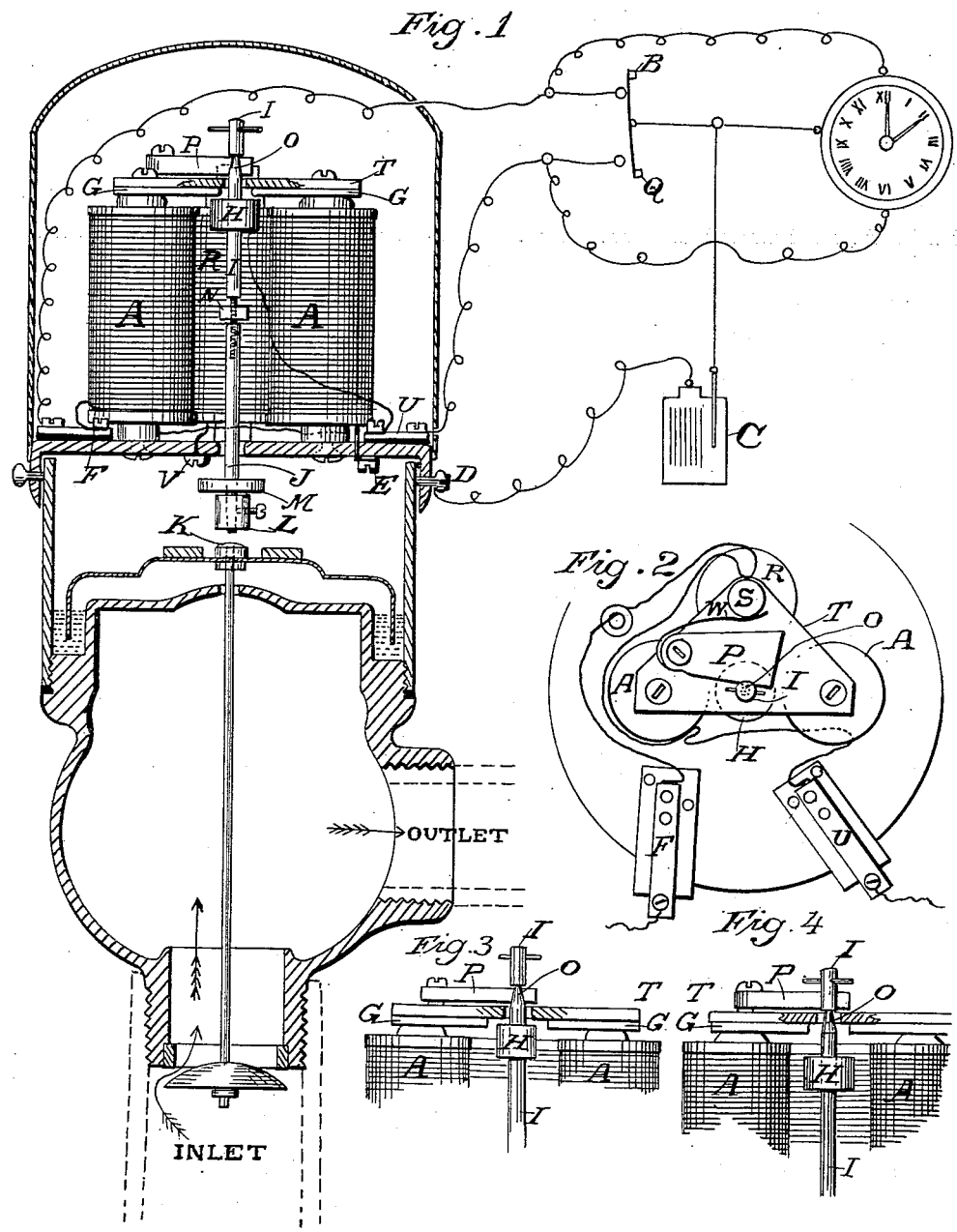

UNITED STATES PATENT OFFICE.

WILLIAM E. H. WILLIAMS AND PAUL SEILER, OF SAN FRANCISCO, CALIFORNIA.

ELECTRIC CONTROLLER FOR GAS-REGULATORS.

SPECIFICATION forming part of Letters Patent No. 602,548, dated April 19, 1898.

Application filed May 13, 1897. Serial No. 636,364. (No model.)

*To all whom it may concern:*

Be it known that we, WILLIAM E. H. WILLIAMS and PAUL SEILER, citizens of the United States, residing in the city and county of San Francisco and State of California, have invented certain new and useful Improvements in Electric Controllers for Gas-Regulators; and we do hereby declare the following to be a full, clear, and exact description of said invention, such as will enable others skilled in the art to which it most nearly appertains to make, use, and practice the same.

Our invention relates to an electrically-operated apparatus to be used in connection with an ordinary gas-regulator, by means of which the weight of the float in the gas-regulator can be supplemented or the supplemental weight removed by simply pressing upon a button at any distance from the regulator.

In an ordinary gas-regulator the inflow of gas to the regulator is governed by a valve, which is connected with the float in the mercury-chamber. The pressure of the gas in the regulator acting upon the float causes the valve to adjust itself with reference to the valve-seat and thereby increase or diminish the area of the gas-inlet according to the pressure. The weight of the float therefore is the prime factor in setting the regulator to any specific supply or pressure, and if this supply or pressure is to be changed it is necessary to increase or diminish the weight of the float by adding or removing temporary weights. These regulators are usually placed in a basement or cellar or some other out-of-the-way place, so that it is necessary if it is desired to add additional weight to the float or to remove a part of the weight to visit the place and add or remove the weight by hand.

Our invention consists of an apparatus which is connected with the ordinary gas-regulator and has a weight or armature adapted to be dropped upon the float or lifted therefrom by electromagnets which are connected by a circuit or circuits with a battery and from which wires may lead to any part of the house or to a central station, where proper circuit-closers are employed and by means of which the circuits may be made or broken and the magnets caused to either lift the weight from the float and hold it in a suspended position free from the float or drop it upon the float, so that its additional weight is added to the float.

Referring to the accompanying drawings, Figure 1 shows an ordinary gas-regulator with our electrical weight lifting and releasing apparatus secured upon its cover and the circuit connections with the battery, also an adaptation whereby the circuit may be connected with a clock for automatically closing and opening the circuit. Fig. 2 is a plan view of the apparatus. Fig. 3 is a side view of the upper end of the magnets and armature-weight, showing the weight raised and latched in suspended position; and Fig. 4 is a similar view showing the armature-weight released and free and in its lower position, so as to rest its weight upon the float.

Let A A represent two electromagnets which are secured upon the cover of the gas-regulator.

G G are the two poles of the magnets, and T is a brass plate which extends across resting upon the poles G G.

I J are two metallic rods which are connected by a screw-turnbuckle N, so that the length of the two pieces may be adjusted to shorten or lengthen the rod, as may be necessary. The upper rod I passes through a hole in the brass plate T, and its upper end has a notch O formed around it, as shown. H is an armature attached to rod I just below the poles of the magnets A A. The lower rod or stem J passes through a hole in the cover of the regulator and has a collar L secured by a screw at its lower end.

M is a weight which is placed upon the rod or stem above the collar and resting upon the collar. This weight may be removed and different weights substituted for it by removing the collar when desired.

R is an electromagnet which is also mounted upon the cover of the gas-regulator and which has a separate electrical connection with the battery, as hereinafter described, and its pole extends above the brass plate T.

P is a pivoted armature which is adapted to be pressed by a flat spring W against the upper end of rod or stem I and engage with the notch O when the stem and armature are raised. The pole of the single coil R is in position to attract the swinging end of this armature when the single coil R is charged, and thereby release the armature from the notch and allow the stem to drop.

Fig. 1 represents a side view of the magnets A A, which when button B is depressed will electrically connect the circuit with zinc of battery C and the carbon electrode connected with the regulator body or cover at D, thence through the magnets A A at E, through the two magnets to connect to binding-plates F and U, and through the wire to button B again to battery to complete the circuit. In charging the magnet A A the two poles of the magnet G G will attract the piece of iron H, as shown, which acts as armature and which is connected solidly with the brass rod or stem I. This stem is screwed into another rod J and extends down toward the top of regulator-float at K. The stem J has a small collar L, fastened with a screw, so as to be able to remove or add the required weight to regulate the flow of gas. The weight, (marked M,) consisting of any kind of metal, can be thus diminished easily without interfering with any other adjustment which may be made at point N, where rod I and J are screwed together to regulate the length. The rod I has a notch O, in which drops an iron armature P, which, being slightly held against the rod I, at all times acting as a pawl, and when armature H, with rods I and J, is pulled up the pawl-armature P snaps into notch and holds the armature H, with its rods I and J and the weights and all connected to same rods, suspended after currents are broken and magnets A A are discharged. When the pressure of gas is to be increased and the weight is to be added to the regulator-float, the button Q is touched and current will pass through the magnet, consisting of one coil R, the extreme pole of which, S, passes through brass plate T. The current from battery when button Q is depressed passes through binding-plate U, through the one-coil magnet, and out into the iron body, to return to battery same as magnets A A are connected to iron body of cover at V. When the one-coil magnet is charged, it will attract the iron pawl or armature P and pull same toward the top of magnet R at S and drop the rod I and J, with its armature H and weights and all connected therewith, so that the whole, acting as a weight, will drop upon regulator-float at K and depress the float, thus acting as a supplemental weight. When button Q is released, the current is broken and armature P, being released, will again take the position and fall back by the action of the small flat spring W (shown in Fig. 2) against the rod ready to engage the rod should it be lifted again. Fig. 3 shows armature or pawl P pressing against rod I at notch O. Fig. 4, showing armature or pawl against the rod I, but the same being dropped, shows the notch O below the pawl or armature.

The plate T on top of magnets is made of brass or other non-magnetic metal or material. Binding-plates U and F are insulated from the iron body of the cover. The apparatus may be made to operate and be charged from an electric-light current, either open or closed circuit, or, if operated by a closed circuit, so that magnets may be kept charged by a current during the time weight is to be suspended free from the float of regulator. In using a closed-circuit arrangement for holding weight suspended by an electric magnet the notch in rod I, the pawl or armature P, and the one-coil magnet R may be dispensed with entirely, as the magnets A A can hold up armature H and the weights attached to same; but a closed-circuit battery or an electric-light current is not as desirable always, and we therefore introduce the device with an open-circuit battery and corresponding attachments necessary to operate the device commercially. We can operate it either way, whichever is most convenient. If the weight is to be suspended by magnets A A and circuit interrupted when weights are to be dropped, the magnet R and pawl or armature P are not required and the button Q and wires leading to binding-plate U and to magnet R may be dispensed with. The magnets in either case can be made of various shapes to suit the taste or convenience. By this arrangement we are able to vary the supply and pressure of gas in the service-pipe without trouble, as the button or circuit-closer can be located at any convenient point. For instance, in a hotel or lodging-house the buttons may be located in the office, where they can be operated to remove or drop the weight at pleasure. In such case the regulator can be allowed to operate with the supplemental weight upon the float and furnish a strong light until any hour—say ten o'clock at night—at which time by simply pressing the button in the office the supplemental weight can be removed from the float and the supply and pressure of gas to the whole house reduced, thus causing a large saving in the amount of gas consumed, or a whole district can be connected with a central station, so that the same operation will operate the entire number of regulators in the district.

Having thus described our invention, what we claim, and desire to secure by Letters Patent, is—

1. In a gas-regulator, the combination of a valve for regulating the pressure, a movable partition actuated by the pressure and connected with the valve to adjust the same and regulate the pressure, a weight opposing the pressure of the gas on said partition, a supplemental weight, an electromagnetic device for removing the supplemental weight, an electric circuit to a distant point energizing the electromagnetic devices, and a switch in the circuit at the distant point, controllable at the will of the operator independently of the gas-pressure, substantially as described.

2. In a gas-regulator, the combination of a valve for regulating the pressure, a movable partition actuated by the pressure and connected with the valve to adjust the same and regulate the pressure, a weight opposing the pressure of the gas on said partition, a supplemental weight, an electromagnetic device for removing the supplemental weight, a catch arranged to retain the weight in its position when so removed, an electromagnetic device actuating said catch to release the weight, electric circuits to a distant point energizing the electromagnetic devices, and a circuit-closing switch at the distant point, controllable at the will of the operator and independently of the gas-pressure, substantially as described.

3. In a gas-regulator having an inlet-valve operated by the gas-pressure in the regulator, electromagnets connected with an electric circuit, a weight connected with an armature and adapted to be lifted by the magnets, a notch on the weight adapted to engage a pawl, which serves as an armature to a single-coil electromagnet when the weight is lifted, and an electric circuit connecting with said single-coil magnet whereby the pawl is withdrawn and released from the notch, substantially as described.

4. In a gas-regulator having an inlet-valve operated by the gas-pressure in the regulator, two independent sets of electromagnets electrically connected by separate circuits with a battery, one of said sets of magnets having an armature connected with a weight, which rests when free upon the float in the regulator; means for suspending said weight when lifted by the magnets, and an armature connected with the other set of magnets, by which the weight is released when the latter magnet or magnets are excited, substantially as described.

5. In a gas-regulator having an inlet-valve operated by a float inside the regulator, a supplemental weight adapted to be added to said float or removed therefrom by means of electromagnets being charged or discharged by electric currents, substantially as above described.

In testimony whereof we have hereunto signed our names, in the presence of two witnesses, this 21st day of April, A. D. 1897.

WILLIAM E. H. WILLIAMS.
PAUL SEILER.

Witnesses:
   CHAS. J. ARMBRUSTER,
   A. P. SEILER.